(12) United States Patent
Zhang et al.

(10) Patent No.: US 9,733,861 B2
(45) Date of Patent: Aug. 15, 2017

(54) DATA TEMPERATURE PROFILING BY SMART COUNTER

(71) Applicant: SK Hynix Memory Solutions Inc., San Jose, CA (US)

(72) Inventors: Fan Zhang, Fremont, CA (US); June Lee, Sunnyvale, CA (US); David J. Pignatelli, Saratoga, CA (US); Yu Cai, San Jose, CA (US)

(73) Assignee: SK hynix memory solutions Inc., San Jose, CA (US)

( * ) Notice: Subject to any disclaimer, the term of this patent is extended or adjusted under 35 U.S.C. 154(b) by 0 days.

(21) Appl. No.: 15/219,113

(22) Filed: Jul. 25, 2016

(65) Prior Publication Data

US 2017/0024163 A1    Jan. 26, 2017

Related U.S. Application Data

(60) Provisional application No. 62/196,852, filed on Jul. 24, 2015.

(51) Int. Cl.
*G06F 3/06* (2006.01)
*G06F 12/06* (2006.01)
*G06F 12/02* (2006.01)

(52) U.S. Cl.
CPC .......... *G06F 3/0647* (2013.01); *G06F 3/0611* (2013.01); *G06F 3/0644* (2013.01); *G06F 3/0653* (2013.01); *G06F 3/0679* (2013.01); *G06F 12/0246* (2013.01); *G06F 12/0646* (2013.01); *G06F 2212/1024* (2013.01); *G06F 2212/1036* (2013.01); *G06F 2212/202* (2013.01); *G06F 2212/7201* (2013.01); *G06F 2212/7204* (2013.01); *G06F 2212/7205* (2013.01)

(58) Field of Classification Search
CPC ..... G06F 2212/7205; G06F 2212/7204; G06F 2212/7201; G06F 2212/1036; G06F 2212/202; G06F 2212/1024; G06F 3/0647; G06F 3/0644; G06F 3/0653; G06F 3/0679; G06F 12/0246; G06F 12/0646
USPC ........................................................ 365/211
See application file for complete search history.

(56) References Cited

U.S. PATENT DOCUMENTS

| 9,141,528 B2 | 9/2015 | Gorobets et al. | |
| 2011/0010489 A1* | 1/2011 | Yeh ..................... | G06F 12/0246 711/103 |
| 2012/0023144 A1* | 1/2012 | Rub .................... | G06F 12/0246 707/813 |
| 2016/0188424 A1* | 6/2016 | Walls .................. | G06F 11/1662 714/6.3 |

* cited by examiner

*Primary Examiner* — Han Yang
*Assistant Examiner* — Xiaochun L Chen
(74) *Attorney, Agent, or Firm* — IP & T Group LLP

(57) ABSTRACT

Memory systems may include a logical block address (LBA) space divided into a number of zones, a counter associated with each zone, each counter suitable for incrementing a count value when a read is performed on an LBA in the zone with which the counter is associated, and a controller suitable for calculating a temperature of each zone based on the count values of the counters, sorting the zones according to the calculated temperature, combining the zones into a number of superzones based on the sorting, and splitting the number of superzones into the number of zones into which the LBA space was divided.

18 Claims, 8 Drawing Sheets

70

80

DATA TEMPERATURE PROFILING BY SMART COUNTER

CROSS-REFERENCE TO RELATED APPLICATIONS

This application claims the benefit of U.S. Provisional Application No. 62/196,852 filed Jul. 24, 2015, the entire contents of which are incorporated herein by reference.

BACKGROUND

1. Field

Exemplary embodiments of the present disclosure relate to a memory system and an operating method thereof.

2. Description of the Related Art

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

Separation of data based on temperature is desired for many processes of the memory devices, such as garbage collection. There exists a need for improved data separation techniques in memory devices.

SUMMARY

Aspects of the invention include memory systems. The memory systems may include a logical block address (LBA) space divided into a number of zones, a counter associated with each zone, each counter suitable for incrementing a count value when a read is performed on an LBA in the zone with which the counter is associated, and a controller suitable for calculating a temperature of each zone based on the count values of the counters, sorting the zones according to the calculated temperature, combining the zones into a number of superzones based on the sorting, and splitting the number of superzones into the number of zones into which the LBA space was divided.

Further aspects of the invention include methods. The methods may include dividing a logical block address (LBA) space into a number of zones, incrementing, with a counter associated with each zone, a count value when a read is performed on an LBA in the zone with which the counter is associated, calculating, with a controller, a temperature of each zone based on the count values of the counters, sorting, with the controller, the zones according to the calculated temperature, combining, with the controller, the zones into a number of superzones based on the sorting, and splitting, with the controller, the number of superzones into the number of zones into which the LBA space was divided.

Additional aspects of the invention includes memory devices. The memory devices may include a logical block address (LBA) space divided into a number of zones, a counter associated with each zone, each counter configured to increment a count value when a read is performed on an LBA in the zone with which the counter is associated, and a controller configured to calculate a temperature of each zone based on the count values of the counters, sort the zones according to the calculated temperature, combine the zones into a number of superzones based on the sorting, and split the number of superzones into the number of zones into which the LBA space was divided.

DETAILED DESCRIPTION

Figure 1:
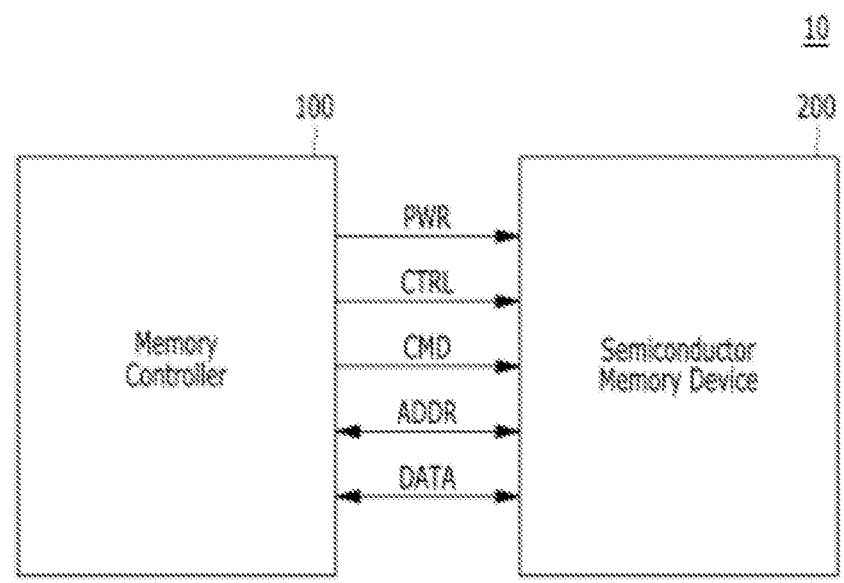
FIG. 1 is a block diagram schematically illustrating a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
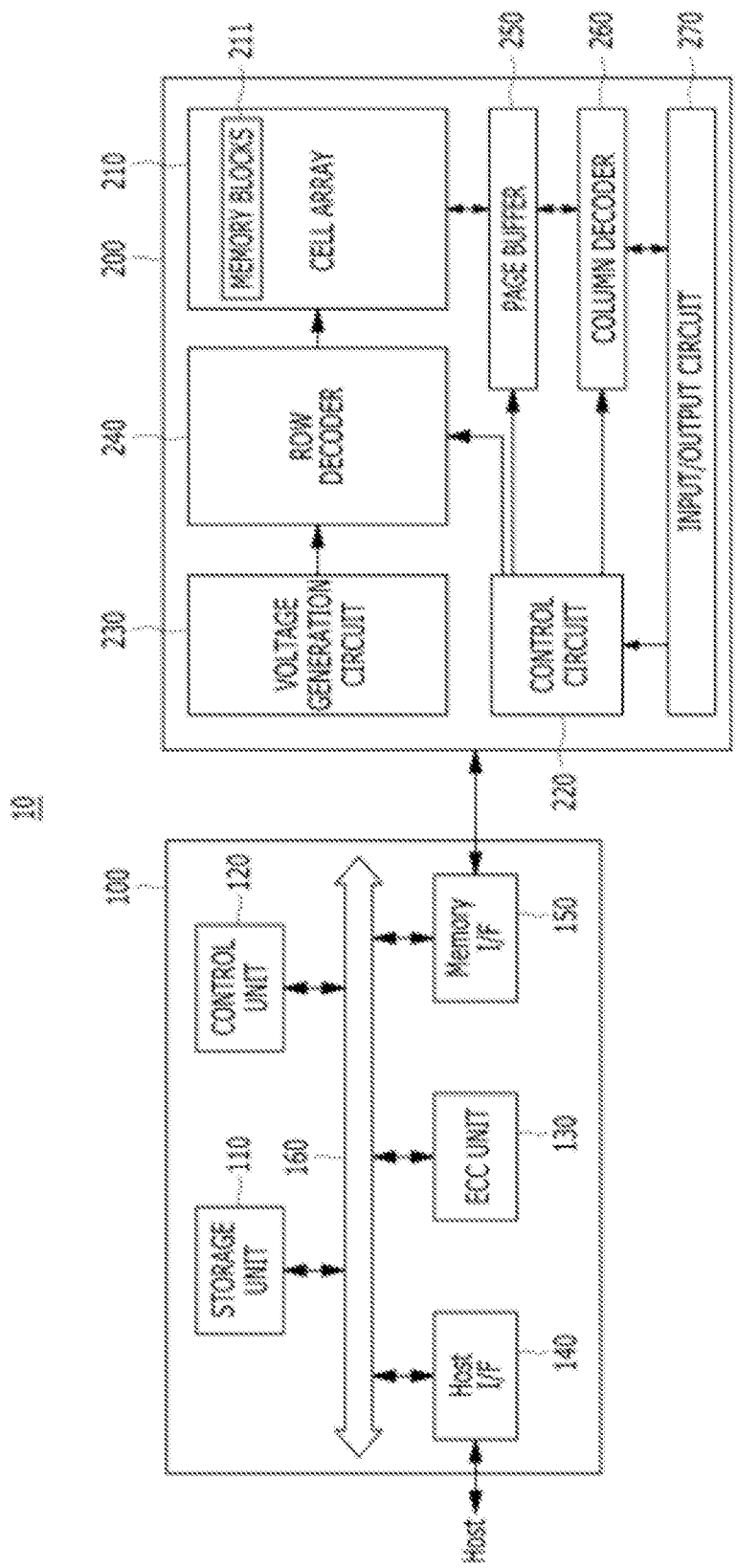
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host device. The controller 100 may provide the data read from the memory device 200, to the host device, and store the data provided from the host device into the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
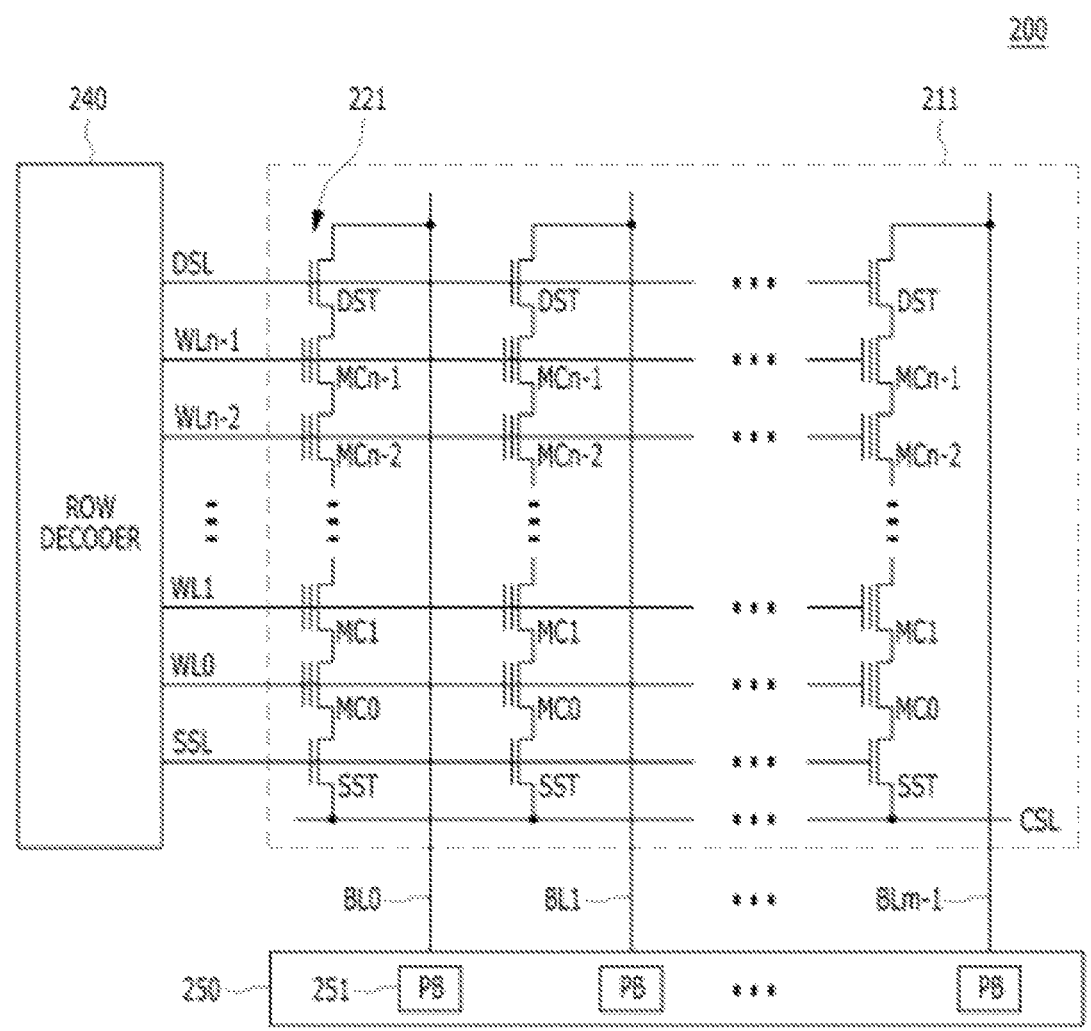
FIG. 3 is a circuit diagram illustrating a memory block of a memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Separation of hot and cold data can lead to significant performance boost in NAND flash memory based storage systems. There are various ways of performing hot-cold data separation. In general, temperature identification is the most difficult part in the data separation algorithms, and it usually consumes a large amount of memory. Disclosed herein are systems, methods, devices, and processes for temperature profiling by using smart counters, including randomized algorithms and iterative algorithms.

Figure 4:
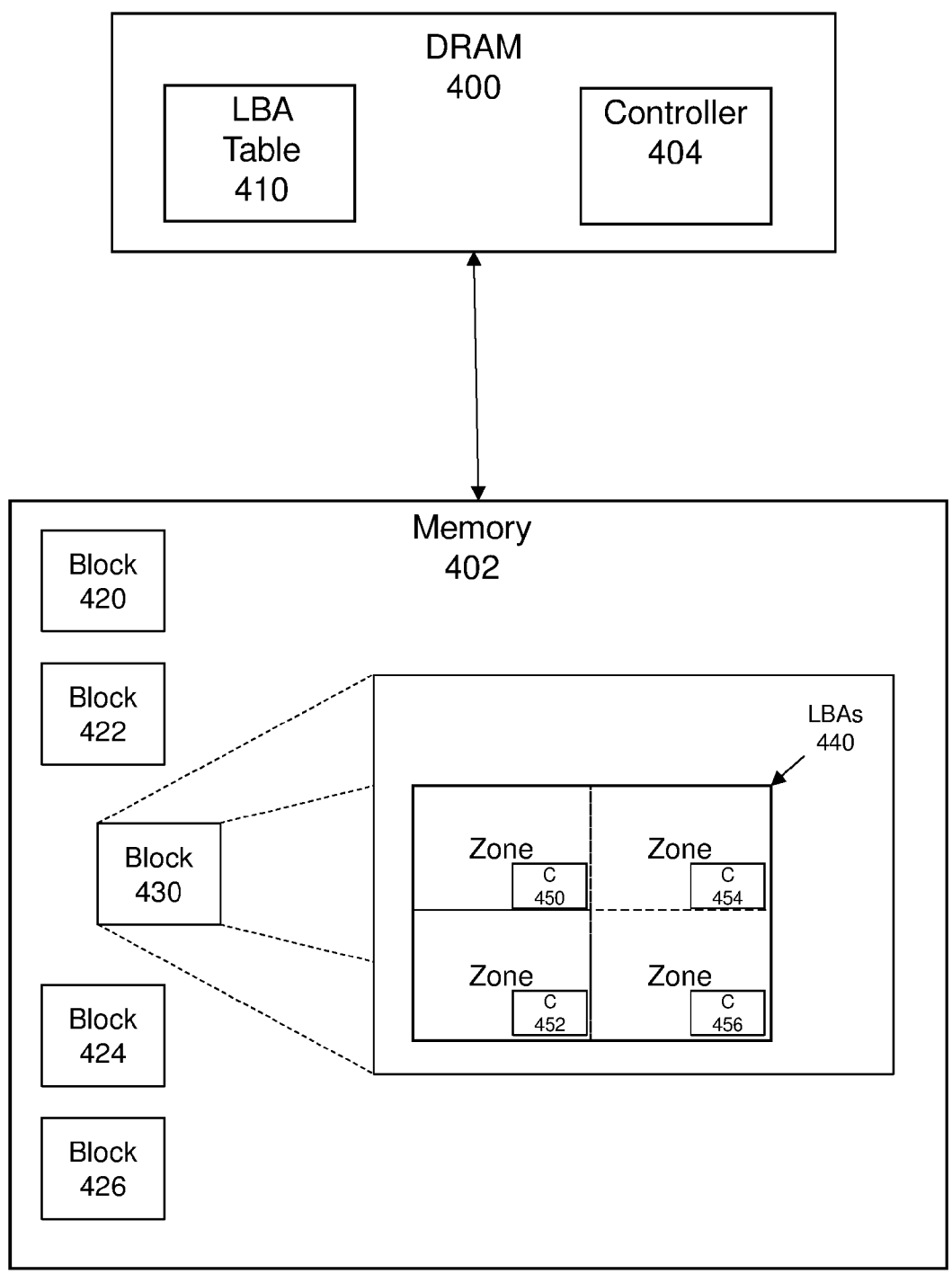
FIG. 4 is a diagram of an example system for data separation according to aspects of the invention.

Referring to FIG. 4, a memory system 40 is shown. The memory system 40 may include a DRAM 400 portion that includes an logical block address (LBA) table 410, and a controller 404. The system may also include a memory portion 402 in communication with the DRAM 400. The memory portion 402 may include a number of blocks, such as blocks 420, 422, 424, 426, and 430.

As disclosed herein, counters are used to count the number of reads for a subset of LBAs instead of just one LBA. These subsets of LBAs are referred to herein as zones. As shown in FIG. 4, block 430 includes LBAs 440 (e.g., an LBA space) that are divided into four zones, with each zone having associated with it a counter 450, 452, 454, 456. It will be understood that although four zones are shown, any number of zones may be utilized in order to effectuate the invention. In addition, the system 40 shows the block 430 divided into zones, but the zones may span over numerous blocks in the memory portion 402. For example, a memory portion may include eight blocks, and four zones with each zone including two of the eight blocks. Other numbers and combinations of zones with blocks and LBA spaces will be understood by those of skill in the art from the disclosure herein.

The LBAs in a zone are not necessarily consecutive LBAs. Each zone may have different number of LBAs. The systems may dynamically group LBAs with similar temperature in the same zone to reduce the number of counters. In an embodiment, the number of counters is equal to the number of zones and also the number of temperature levels the systems can identify. Each zone may correspond to a predefined or dynamic temperature level. Two or several zones may be combined. One zone can also be split into two or multiple zones. The temperature of a zone may calculated by the number of reads in the zone divided by the total number of reads being done to all zones. In this way, the sum of temperature values over all zones is equal to 1. The counters may be periodically reset so that a new round of temperature estimation will be started again. In this way, the system can catch up with the possible change of the temperature profile.

The following notations are used herein:

c: number of counters used. It is also equal to the number of zones and also the number of temperature levels the algorithm trying to identify.

T: the period for temperature profiling, in the unit of host reads.

r: the number of reads applied to a zone within a temperature profiling period.

The systems are designed to classify all LBAs into c temperature levels, which leads to the assumption that $\lceil \log_2 c \rceil$ bits are added to each entry of the LBA table to indicate which zone each LBA is in.

Most of the memory usage in the algorithm, both its original form and in a bloom filter based approach, is spent on describing the set of elements in each zone. To describe the elements in each zone without error, $\lceil \log_2 c \rceil$ bits are needed for every entry. Bloom filter reduces the memory usage by allowing certain probability of error when describing the elements in the zones. However, this could still lead to high memory usage. Memory usage may be further reduced by using pseudo-random zone-splitting scheme so that the memory needed for describing the elements in the zone becomes small.

Thus, the systems disclosed herein are designed to save memory. Since most of the memory is spent in describing the LBAs in each zone, the systems may explicitly calculate the zone to which an LBA belongs instead of looking it up in tables or bloom filters, as those processes consume large amounts of memory. This requires enforcing certain mathematical relationships between an LBA and its zone index. On one hand, the relationship may look random (over different LBAs, and also over different iterations) to maintain the power of the original algorithm. On the other hand, the relationship may be deterministic, so that how an LBA is mapped to a zone can be explicitly calculated without using a giant table to remember the mapping. Affine permutation functions may be used as described below to create these mappings in a pseudo-random way.

Figure 5:
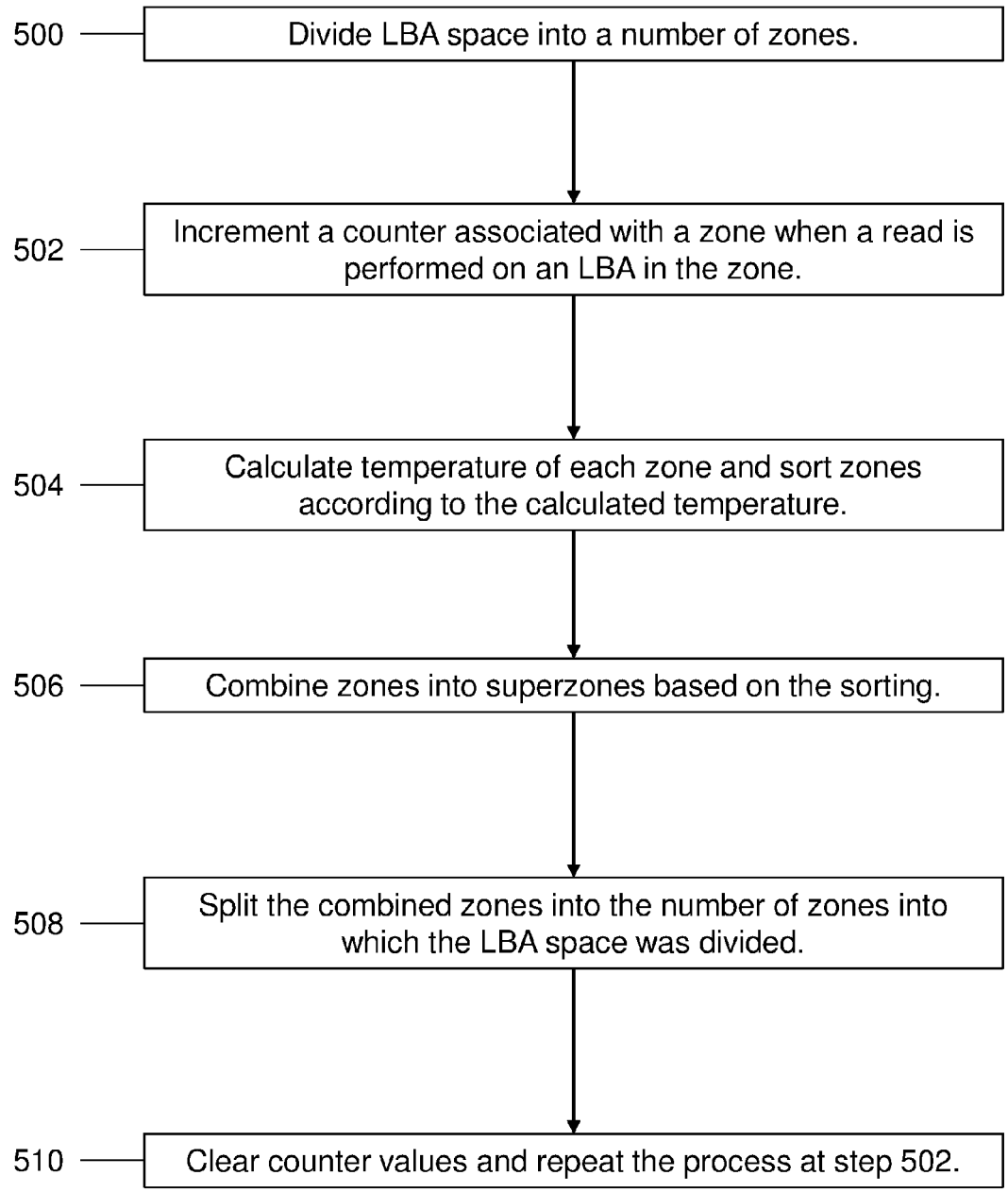
FIG. 5 is a flowchart of steps in a method for data separation in accordance with aspects of the invention.
Figure 6:
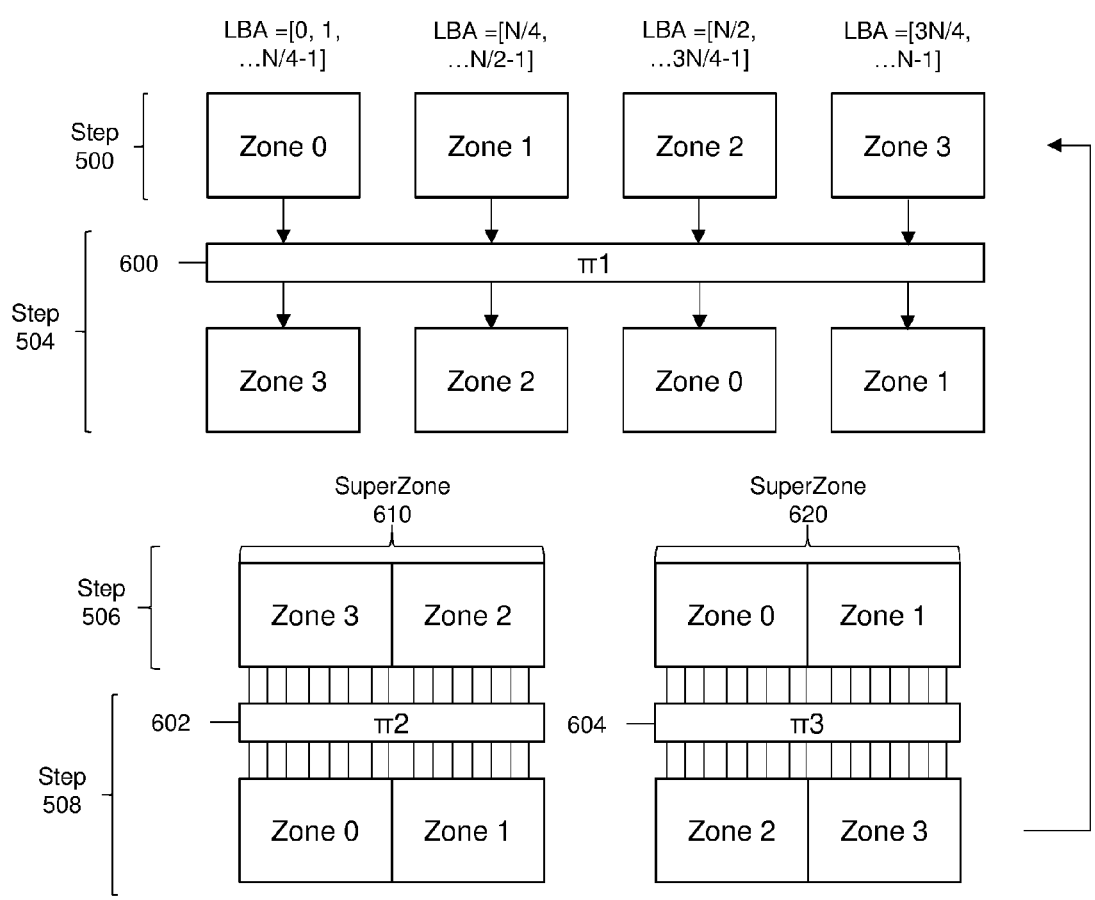
FIG. 6 is a diagram illustrating steps for data separation according to aspects of the invention.
Figure 7:
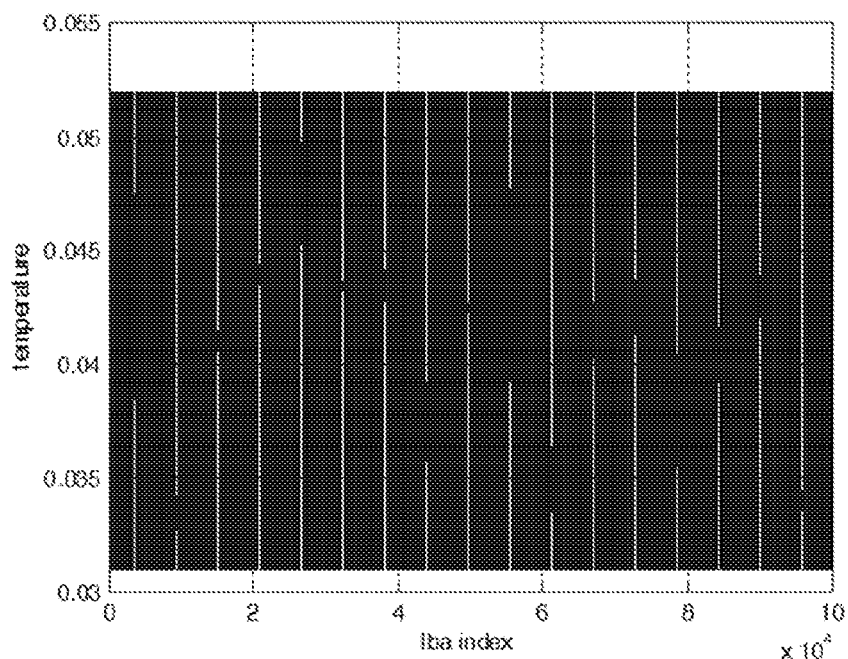
FIGS. 7, 8, 9, and 10 are graphs showing data separation performance according to aspects of the invention.
Figure 8:
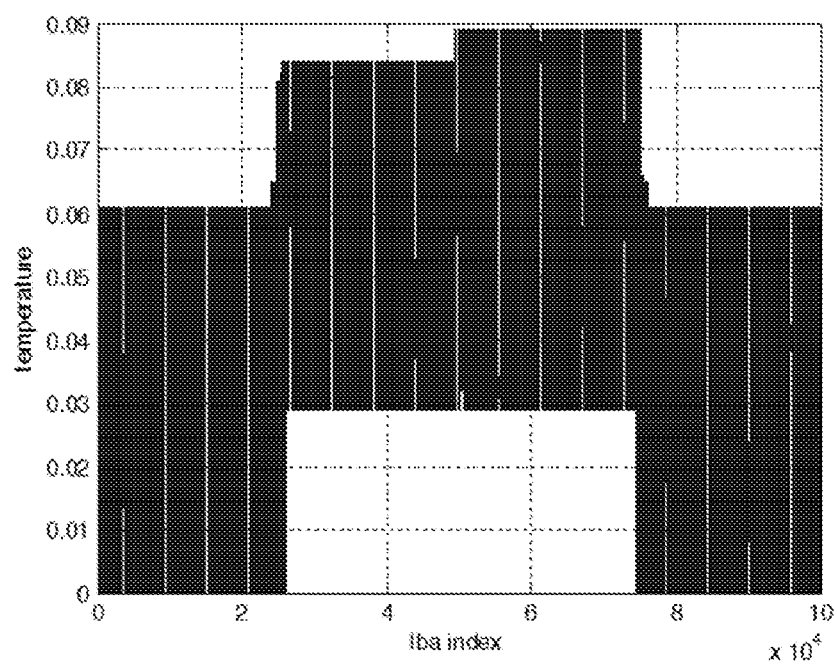
Figure 9:
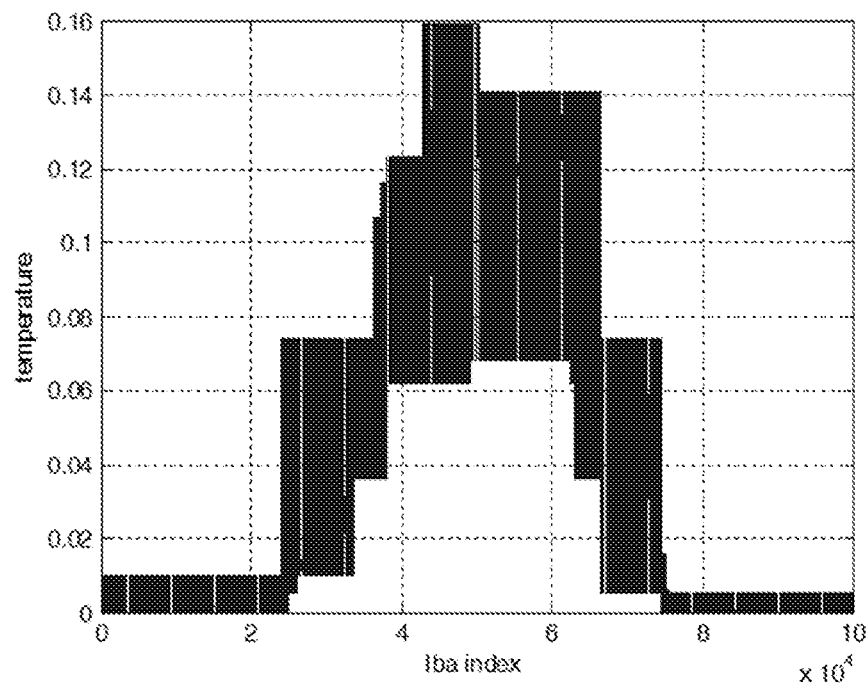
Figure 10:
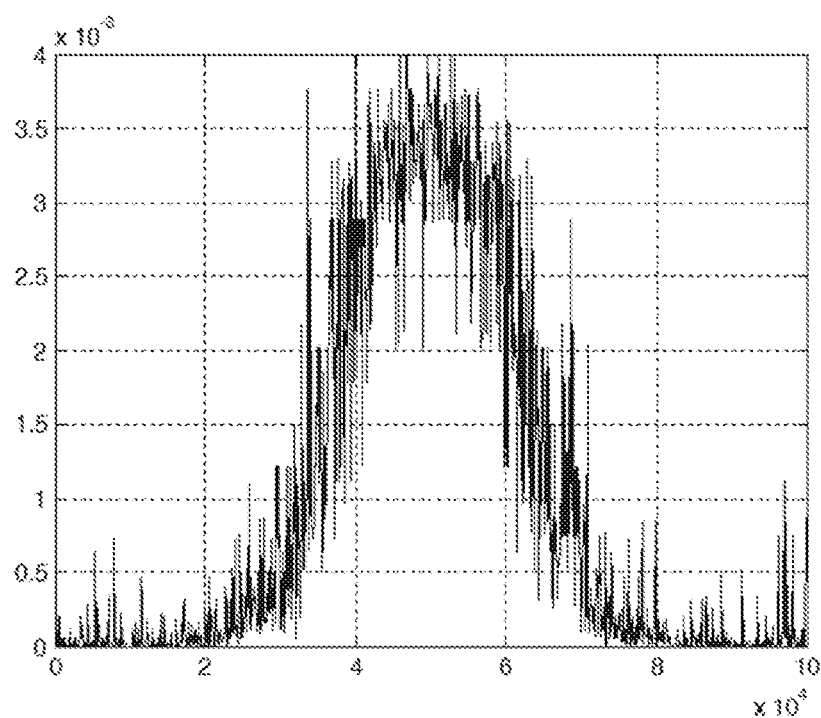

The invention disclosed herein will be described with reference to FIGS. 5 and 6. FIG. 5 is a flowchart 50 of steps in a method for data separation. FIG. 6 is a diagram illustrating steps for data separation.

At step 500, the LBA space is divided into a number of zones. In the examples described below, the number of zones is shown as four (Zone 0, Zone 1, Zone 2, Zone 3). However, as set forth above, other numbers may be utilized. In this example, c=4. The total number of LBA is denoted as N. Each zone may contain consecutive LBAs so that the complexity to describe the LBAs in a zone is extremely low (only the first and last LBAs are needed).

At step 502, a counter associated with a zone is incremented when a read is performed on an LBA in the zone. Each zone has associated with it a counter. The counters include a count value, and the count value may be incremented by a predefined number (e.g., 1) each time a read is performed on an LBA in the zone to which the counter is associated.

At step 504, the temperature of each zone is calculated and the zones are sorted according to the calculated temperature. The calculated temperature may be an average temperature. In an embodiment, the temperature is based on predefined ranges of the number of reads to LBAs within each zone. The zones are then sorted. The zones may be sorted by coldest temperature to hottest temperature.

The relationship between the zone indices before and after sorting can be represented by a permutation of size c. This permutation 600 is denoted as $\pi_1$. The amount of memory needed to describe $\pi_1$ is $\lceil \log_2 c \rceil$ bits, which is small. In the example shown in FIG. 6, the sorting and index change following the permutation results in the order of Zone 3, Zone 2, Zone 0, and Zone 1.

After sorting the zones, at step 506, the zones are combined into superzones based on the sorting. The zones may be combined based on adjacent zones. As shown in FIG. 6, Zone 3 and Zone 2 are combined into superzone 610, and Zone 0 and Zone 1 are combined into superzone 620, as Zone 3 and Zone 2 are adjacent and Zone 0 and Zone 1 are adjacent. The combination, however, does not have to be equal. For example, in some embodiments, the combination results in a first superzone having three zones combined into it and the second superzone only having one zone. Other such combinations will be understood to those of skill in the art from the description herein.

At step 508, the combined zones (e.g., the superzones) are split into the number of zones into which the LBA space was divided. It is contemplated that the number of superzones may be split into a different number of zones from that which the LBA space was originally divided. The superzones 610 and 620 may be split in a pseudo random way. The cardinality may be denoted of the first (and second) superzone as $s_1$ (and $s_2$). The split operation can be described as two permutations $\pi_2$ 602 and $\pi_3$ 604, where $\pi_2$ is of size $s_1$ and $\pi_3$ is of size $s_2$. The LBAs in the first combined zone 610 are denoted as $[I_1, I_2, \ldots I_{s_1}]$. $\pi_2$ is chosen to be: $\pi_2$: $Z^s_1 \rightarrow Z^s_1$, $\pi_2(x)=ax+b \mod s_1$, where a is an integer which is co-prime to $s_1$, and b is an integer between 1 and $s_1$. In this way, $\pi_2$ is a bijection which is pseudo-random. In the same way, $\pi_3$ may be chosen to be $\pi_3$: $Z^s_2 \rightarrow Z^s_2$, $\pi_3(x)=cx+d \mod s_2$, where c is an integer which is co-prime to $s_2$, and d is an integer between 1 and $s_2$.

At step 510, the counter values are cleared and the process may be repeated at step 502.

In different iterations, it may be desirable to choose different coefficients for the affine permutations. The permutations are denoted as $\pi_1^{(i)}$, $\pi_2^{(i)}$ and $\pi_3^{(i)}$, where i is the iteration number. The coefficient of the affine permutations is denoted as $a^{(i)}$, $b^{(i)}$, $c^{(i)}$ and $d^{(i)}$.

The zone index can be quickly determined when an LBA comes. Assuming the iteration number is 1 and the LBA value is I. The zone index before sorting is $$z_{step1} = \left\lfloor \frac{4l}{N} \right\rfloor.$$

The zone index after sorting is $Z_{step2} = \pi_1(Z_{step1})$. The super-zone index is $$z_{step3}\left\lfloor \frac{z_{step2}}{2} \right\rfloor.$$

The offset of LBA/in its zone at step 500 is denoted as $t_{step1}(I)$ and the offset of I in its super-zone at step 506 is denoted as $t_{step3}(I)$. Thus, $$t_{step1}(l) = l \bmod \left(\frac{N}{4}\right).$$

The value of $t_{step3}(I)$ can be calculated as:

$$t_{step3}(l) = \frac{N}{4}(z_{step2} \bmod 2) + t_{step1}(l).$$

According to the affine permutation, the offset of I in its super-zone after split is $$t_{step4}(l) = a^{(1)} t_{step3}(l) + b^{(1)} \bmod \left(\frac{N}{2}\right),$$

and the zone number that I falls into after zone split is $$z_{step4}(l) = 2 z_{step3} + \left\lfloor \frac{4 t_{step4}(l)}{N} \right\rfloor.$$

Thus, after running one iteration, the zone index of an arbitrary LBA I can be calculated explicitly by using the above equations.

In more general situation, after running the algorithm for i iterations, the zone index of an arbitrary LBA can be calculated in this way recursively. As the iteration number grows, the calculation may become slower. Thus, it may be desirable to limit the iteration number to be less than 20 or 30. Most of the time, running the algorithm with 20 iterations provides decent temperature profiling.

Referring next to FIGS. 7-10, graphs showing the performance of data separation based on temperature profiling and zoning are shown. In these examples, the max LBA was chosen to be $10^5$, T=1000, c=50. Initially, 50 zones were chosen randomly. Every T host reads is an iteration. The LBAs are generated by a Gaussian distribution with mean $10^3/2$ and variance $10^3/10$. The LBAs below 0 and above $10^5$ were truncated.

In the first iteration, the temperature profile is shown in graph 70. The estimated temperature looks random because every zone contains a similar percentage of hot and cold data. Thus, the average temperature looks similar across all zones.

After the fourth iteration, the estimated temperature profile is shown in graph 80. The LBAs with similar temperature begin to gather together in the same zone, so the average temperature becomes slightly different across the zones.

After the ninth iteration, the estimated temperature profile is shown in graph 90. Clustering improves on LBAs with different temperatures, resulting in a better profiling of the true distribution.

After the $18^{th}$ iteration, the estimated temperature profile is shown in graph 1000. There is still some noise in the profile due to the amount of data. The greater number of counters used, the less noisy the temperature profile is. As can be seen, more iterations leads to better representation of the temperature profile.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory system, comprising:
    a logical block address (LBA) space divided into a number of zones;
    a counter associated with each zone, each counter suitable for incrementing a count value when a read is performed on an LBA in the zone with which the counter is associated; and
    a controller suitable for:
        calculating a temperature of each zone based on the count values of the counters;
        sorting the zones according to the calculated temperature;
        combining the zones into a number of superzones based on the sorting; and
        splitting the number of superzones into the number of zones into which the LBA space was divided.

2. The memory system of claim 1, wherein the controller is further suitable for sorting the zones in order of coldest zone to hottest zone.

3. The memory system of claim 1, wherein the controller is further suitable for splitting the superzones pseudo-randomly.

4. The memory system of claim 1, wherein the controller is further suitable for splitting the superzones based on a predefined number of affine permutations.

5. The memory system of claim 1, wherein the controller is further suitable for clearing the count values of the counters after the splitting.

6. The memory system of claim 1, wherein the number of zones is four or more.

7. A method, comprising:
    dividing a logical block address (LBA) space into a number of zones;
    incrementing, with a counter associated with each zone, a count value when a read is performed on an LBA in the zone with which the counter is associated;
    calculating, with a controller, a temperature of each zone based on the count values of the counters;
    sorting, with the controller, the zones according to the calculated temperature;
    combining, with the controller, the zones into a number of superzones based on the sorting; and
    splitting, with the controller, the number of superzones into the number of zones into which the LBA space was divided.

8. The method of claim 7, wherein the zones are sorted in order of coldest zone to hottest zone.

9. The method of claim 7, further comprising splitting the superzones pseudo-randomly.

10. The method of claim 7, wherein the superzones are split based on a predefined number of affine permutations.

11. The method of claim 7, further comprising clearing the count values of the counters after the splitting.

12. The method of claim 7, wherein the number of zones is four or more.

13. A memory device, comprising:
- a logical block address (LBA) space divided into a number of zones;
- a counter associated with each zone, each counter configured to increment a count value when a read is performed on an LBA in the zone with which the counter is associated; and
- a controller configured to:
  - calculate a temperature of each zone based on the count values of the counters;
  - sort the zones according to the calculated temperature;
  - combine the zones into a number of superzones based on the sorting; and
  - split the number of superzones into the number of zones into which the LBA space was divided.

14. The memory device of claim 13, wherein the controller is further configured to sort the zones in order of coldest zone to hottest zone.

15. The memory device of claim 13, wherein the controller is further configured to split the superzones pseudo-randomly.

16. The memory device of claim 13, wherein the controller is further configured to split the superzones based on a predefined number of affine permutations.

17. The memory device of claim 13, wherein the controller is further configured to clear the count values of the counters after the splitting.

18. The memory device of claim 13, wherein the number of zones is four or more.

* * * * *